(12) United States Patent
Larco et al.

(10) Patent No.: US 9,152,317 B2
(45) Date of Patent: Oct. 6, 2015

(54) MANIPULATION OF GRAPHICAL ELEMENTS VIA GESTURES

(75) Inventors: Vanessa A. Larco, Kirkland, WA (US); Daniel J. Wigdor, Seattle, WA (US); Sarah Graham Williams, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 887 days.

(21) Appl. No.: 12/541,795

(22) Filed: Aug. 14, 2009

(65) Prior Publication Data

US 2011/0041096 A1 Feb. 17, 2011

(51) Int. Cl.
G06F 3/0488 (2013.01)
G06F 3/0482 (2013.01)

(52) U.S. Cl.
CPC .......... *G06F 3/04883* (2013.01); *G06F 3/0482* (2013.01); *G06F 2203/04808* (2013.01)

(58) Field of Classification Search
CPC .... G06F 3/04883; G06F 3/017; G06F 3/0488
USPC .......................................................... 715/863
See application file for complete search history.

(56) References Cited

U.S. PATENT DOCUMENTS

| 7,093,201 | B2* | 8/2006 | Duarte | 715/853 |
|---|---|---|---|---|
| 7,643,012 | B2* | 1/2010 | Kim et al. | 345/173 |
| 8,312,374 | B2* | 11/2012 | Ozawa et al. | 715/702 |
| 8,799,827 | B2* | 8/2014 | Hinckley et al. | 715/863 |
| 2003/0043206 | A1* | 3/2003 | Duarte | 345/810 |
| 2006/0026535 | A1* | 2/2006 | Hotelling et al. | 715/863 |
| 2007/0152984 | A1* | 7/2007 | Ording et al. | 345/173 |
| 2007/0229471 | A1* | 10/2007 | Kim et al. | 345/173 |
| 2007/0298849 | A1* | 12/2007 | Kang et al. | 455/575.1 |
| 2008/0094368 | A1* | 4/2008 | Ording et al. | 345/173 |
| 2008/0165132 | A1* | 7/2008 | Weiss et al. | 345/173 |
| 2008/0180399 | A1* | 7/2008 | Cheng | 345/173 |
| 2008/0231610 | A1 | 9/2008 | Hotelling et al. | |
| 2008/0259025 | A1* | 10/2008 | Eom | 345/156 |
| 2008/0316183 | A1* | 12/2008 | Westerman et al. | 345/173 |
| 2009/0006292 | A1* | 1/2009 | Block | 706/20 |
| 2010/0020025 | A1* | 1/2010 | Lemort et al. | 345/173 |
| 2010/0211920 | A1* | 8/2010 | Westerman et al. | 715/863 |

(Continued)

OTHER PUBLICATIONS

Butler, et al., "SideSight: Multi-"Touch" Interaction around Small Devices", Retrieved at << http://research.microsoft.com/en-us/um/people/shodges/papers/sidesight_crv3.pdf >>, pp. 4.

(Continued)

*Primary Examiner* — Reza Nabi
(74) *Attorney, Agent, or Firm* — Judy Yee; Micky Minhas (57) ABSTRACT

A method of operating a graphical user interface of a computing device is disclosed. The method comprises displaying a graphical user interface (GUI) element on the touch sensitive display screen. The method further comprises in response to receiving touch input data indicative of a one-touch gesture mapping the one-touch gesture to a corresponding GUI element function. The method further comprises in response to receiving touch input data indicative of a multi-touch gesture, mapping the multi-touch gesture to the corresponding GUI element function. The method further comprises transforming display of the GUI element on the touch sensitive display screen based on the corresponding GUI element function.

15 Claims, 4 Drawing Sheets

(56) References Cited

U.S. PATENT DOCUMENTS

| | | | |
|---|---|---|---|
| 2010/0245282 A1* | 9/2010 | Lai | 345/174 |
| 2010/0281374 A1* | 11/2010 | Schulz et al. | 715/723 |
| 2010/0306702 A1* | 12/2010 | Warner | 715/811 |
| 2010/0333011 A1* | 12/2010 | Kornev et al. | 715/773 |
| 2011/0004853 A1* | 1/2011 | Chang | 715/863 |
| 2011/0202878 A1* | 8/2011 | Park et al. | 715/825 |
| 2011/0209099 A1* | 8/2011 | Hinckley et al. | 715/863 |

OTHER PUBLICATIONS

Izadi, et al., "C-Slate: A Multi-Touch and Object Recognition System for Remote Collaboration using Horizontal Surfaces", Second Annual IEEE International Workshop on Horizontal Interactive Human-Computer System, 2007, IEEE, Retrieved at << http://ieeexplore.ieee.org/stamp/stamp.jsp?arnumber=04384105 >>, pp. 3-10.

"Engineering Windows 7 Welcome to our blog dedicated to the engineering of Microsoft Windows 7", 2009, Microsoft Corporation, Retrieved at << http://blogs.msdn.com/e7/archive/2009/01/28/showcasing-windows-7-platform-with-applets-and-gadgets.aspx >>, pp. 13.

Haliburton, et al., "Gestures in User Interface Design", Retrieved at << http://www.tat.se/site/media/downloads/Intro%20to%20Gestures_FINAL.pdf >>, pp. 5.

Apted, et al., "Tabletop Sharing of Digital Photographs for the Elderly", Apr. 22-27, 2006, CHI 2006 Proceedings Collecting and Editing Photos, Retrieved at << http://delivery.acm.org/10.1145/1130000/1124887/p781-apted.pdf key1=1124887&key2=63628224 21&coll=GUIDE&dl=GUIDE&CFID=34515256&CFTOKEN=51327879 >>, pp. 781-790.

* cited by examiner

MANIPULATION OF GRAPHICAL ELEMENTS VIA GESTURES

BACKGROUND

A mouse has been implemented to allow a user to provide input to a computing device to control presentation of a display screen. This form of input evolved in later generations of computing devices to produce a paradigm where one-touch gestural input was used to provide input to control presentation of a touch sensitive display screen. Later still, a paradigm where multi-touch gestural input was used to provide input to control presentation of a touch sensitive display screen was produced. The existence of plural different types of user input paradigms created generations of users that are most comfortable using one type of user input paradigm. In order to produce a product that works for different generations of computing devices, previously developers have selected to implement one type of user input paradigm in their product. This causes confusion in users that are comfortable with a type of user input paradigm other than the one used in the product, which results in frustration with the product and less use of the product.

SUMMARY

Accordingly, various embodiments related to the manipulation of GUI elements using one-touch gestures and/or multi-touch gestures on a touch sensitive display screen are disclosed herein. For example, in one embodiment, a method of operating a graphical user interface of a computing device is disclosed. The method comprises displaying a graphical user interface (GUI) element on the touch sensitive display screen. The method further comprises in response to receiving touch input data indicative of a one-touch gesture, mapping the one-touch gesture to a corresponding GUI element function. The method further comprises in response to receiving touch input data indicative of a multi-touch gesture, mapping the multi-touch gesture to the corresponding GUI element function. The method further comprises transforming display of the GUI element on the touch sensitive display screen based on the corresponding GUI element function.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
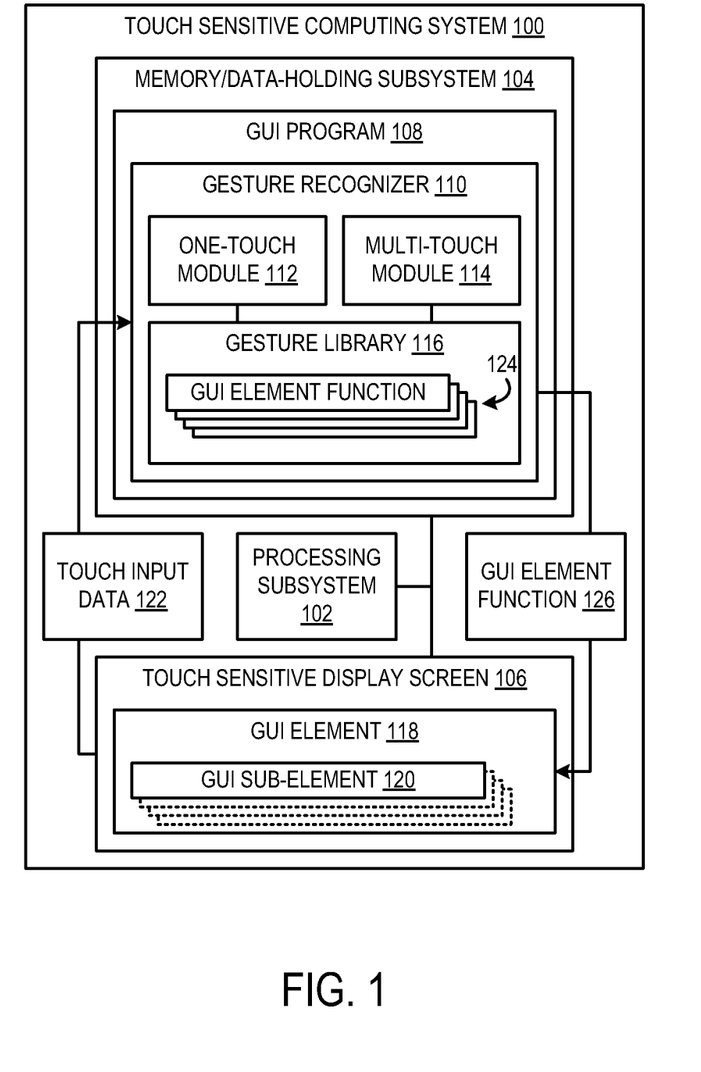
FIG. 1 shows a block diagram of an embodiment of a computing device including a touch sensitive display screen.

Various embodiments are disclosed herein that relate to manipulation of a GUI element via one-touch gestures or multi-touch gestures that produce the same function. FIG. 1 shows a block diagram of an embodiment of a touch sensitive computing system 100 comprising a processing subsystem 102 and a memory/data-holding subsystem 104 operatively coupled to processing subsystem 102. The touch sensitive computing system 100 may further comprise a touch sensitive display screen 106 that may be operatively coupled with processing subsystem 102 and memory/data-holding subsystem 104. The touch sensitive display screen 106 may be configured to present a visual representation of data held by memory/data-holding subsystem 104.

The touch sensitive display screen 106 may act as an I/O interface. That is, touch sensitive display screen 106 may be configured to accept user input in the form of one or more touches, as well as display graphical user interface (GUI) elements that may be manipulated by the touches provided to the touch sensitive display screen 106. The touch sensitive display screen 106 may be configured to detect one-touch input as well as multi-touch input or plural temporally overlapping touches. The touch sensitive display screen 106 may be configured to distinguish each different touch input of a multi-touch input.

Multi-touch input may be provided to the touch sensitive display screen in a variety of ways. For example, multi-touch input may be provided by touches from a user's index fingers (different hands), or touches from a user's thumb and index finger (same hand). It will be appreciated that multi-touch input may include two or more temporally overlapping touches.

In some embodiments, the touch sensitive display screen 106 may be configured to detect touch input provided by different sources, such as a touch from a user's finger, a stylus, a pen, or a combination thereof. In some embodiments, the touch sensitive display screen 106 may be configured to detect near touches or approaches of touches. For example, the touch sensitive display may be configured to detect an approach of a pen touch when the pen is approaching a particular location on the display surface and is within range of or at a predetermined distance from the display surface.

The touch sensitive display screen may implement virtually any suitable technology to detect touch input, such as optical technology, infrared technology, resistive technology, capacitive technology, etc.

Processing subsystem 102 may be configured to run interface instructions of memory/data-holding subsystem 104 so as to provide user interface functionality in connection with touch sensitive display screen 106. In some cases, the interface instructions may be embodied as programs that may be implemented as software and/or firmware. In the illustrated embodiment, the interface instructions may take the form of a GUI program 108. The GUI program may be configured to display a GUI element 118 on touch sensitive display screen 106. The GUI element may be virtually any suitable graphical representation of data held in memory/data-holding subsystem. Examples of the GUI element may include icons representing files or applications, an organizational hierarchy (e.g., a branching hierarchy), menus, folders, thumbnails or full-sized images that represent media content including either still or video images, application windows, interactive objects such as touch input controls (e.g. buttons or the like) in an application window, letters/characters/symbols that may be selected for text input, or any other suitable object and/or combinations thereof. The GUI element may include one or more GUI sub-elements 120. The GUI sub-elements may be virtually any suitable graphical representation of data held in memory/data-holding subsystem that is associated with the GUI element. Examples of the GUI sub-elements may include submenu elements, selectable menu options, sub-folders, files, applications, thumbnails or full-sized images that represent media content including either still or video images, application windows, interactive objects such as touch input controls (e.g. buttons or the like) in an application window, letters/characters/symbols that may be selected for text input, or any other suitable object and/or combinations thereof. Display of the GUI element 118 and/or the GUI sub-elements 120 on touch sensitive display screen 106 may be selectively transformable based on the touch input data 122.

More particularly, the GUI program 108 may comprise a gesture recognizer 110 that may be configured to provide a GUI element function 126 to touch sensitive display screen 106 to transform display of GUI element 118 and/or GUI sub-elements 120 based on touch input data 122. The gesture recognizer 110 may be operatively coupled with touch sensitive display screen 106, such that touch input data 122 generated based on touch input to the touch sensitive display screen may be sent to the gesture recognizer. The gesture recognizer 110 may be implemented to analyze touch input data 122 in order to recognize one-touch gestural input and/or multi-touch gestural input. Further, gesture recognizer 110 may be configured to provide GUI element function 126 corresponding to the recognized one-touch input or multi-touch input that transforms display of GUI element 118 and/or GUI sub-elements 120. Accordingly, either one-touch input or multi-touch input may be provided to the touch sensitive display screen to control display of the GUI element and/or the GUI sub-elements.

The gesture recognizer 110 may comprise a one-touch module 112, a multi-touch module 114, and a gesture library 116. The one-touch module 112 may be configured to receive touch input data 122. The one-touch module 112 may analyze touch input data 122 to recognize a predefined one-touch gestural shape. Further, one-touch module 112 may provide a one-touch gesture to gesture library 116 in response to the touch input data corresponding to a one-touch input gestural shape. For example, the touch input data may be indicative of a single touch input tracing a path along a line segment in a particular region and/or direction and the one-touch module may recognize such touch input as a predefined one-touch gestural shape and provide a corresponding one-touch gesture to the gesture library.

Likewise, the multi-touch module 114 may be configured to receive touch input data 122. The multi-touch module 114 may analyze touch input data 122 to recognize a predefined multi-touch gestural shape. Further, multi-touch module 114 may provide a multi-touch gesture to gesture library 116 in response to the touch input data corresponding to a multi-touch input gestural shape. For example, the touch input data may be indicative of two different temporally overlapping touch inputs being positioned at endpoints of a line segment in a particular region and/or direction and the multi-touch module may recognize such touch inputs as a predefined multi-touch gestural shape and provide a corresponding multi-touch gesture to the gesture library.

In some embodiments, the gesture recognizer may be implemented such that only the one-touch module receives the touch input data and provides one-touch gestures to the multi-touch module as well as the gesture library. Further, the multi-touch module may be configured to recognize a multi-touch gestural shape achieved via interpolation of plural one-touch gestures in a given sequence and provide the corresponding multi-touch gesture to the gesture library.

The gesture library 116 may comprise a plurality of GUI element functions 124. Each of the plurality of GUI element functions may be performed to transform display of GUI element 118 and/or GUI sub-elements 120 in a different way. Examples of GUI element functions may include displaying a GUI element or GUI sub-element(s), concealing a GUI element or GUI sub-element(s), changing an appearance of a GUI element or GUI sub-element, performing a computing operation (e.g., execute a command, launch an application, open a window, edit an element, etc.) associated with a GUI element or GUI sub-element, etc.

Within gesture library 116, each GUI element function of the plurality of GUI element functions 124 may be mapped to a corresponding one-touch gesture and/or a corresponding multi-touch gesture. At least some GUI element functions may be mapped to a corresponding one-touch gesture as well as to a corresponding multi-touch gesture. The gesture library 116 may be configured to provide a selected GUI element function 126 of the plurality of GUI element functions 124 to touch sensitive display screen 106 to transform display of the GUI element 118 and/or GUI sub-elements 120 in response to receiving a corresponding one-touch gesture from one-touch module 112 or a corresponding multi-touch gesture from multi-touch module 114 that is mapped to the selected GUI element function 126 of the plurality of GUI element functions 124.

Accordingly, a GUI element presented on the touch sensitive display screen of the touch sensitive computing system may be capable of accepting one-touch input, as well as multi-touch input to perform the same functions to transform display of the GUI element. This may allow a user to choose the type of user input paradigm that they want to use to interact with the GUI element. Moreover, the above described system may provide flexibility to be implemented across computing systems that implement different types of user input paradigms and still may retain functionality. For example, the system may be implemented with a hardware configuration that only uses mouse or one-touch input. In such an implementation the multi-touch input and gesture recognition may be disabled.

The touch sensitive computing systems described herein may be implemented in various forms, including a tablet computer, laptop, smartphone, portable digital assistant, digital notebook, etc.

Figure 2:
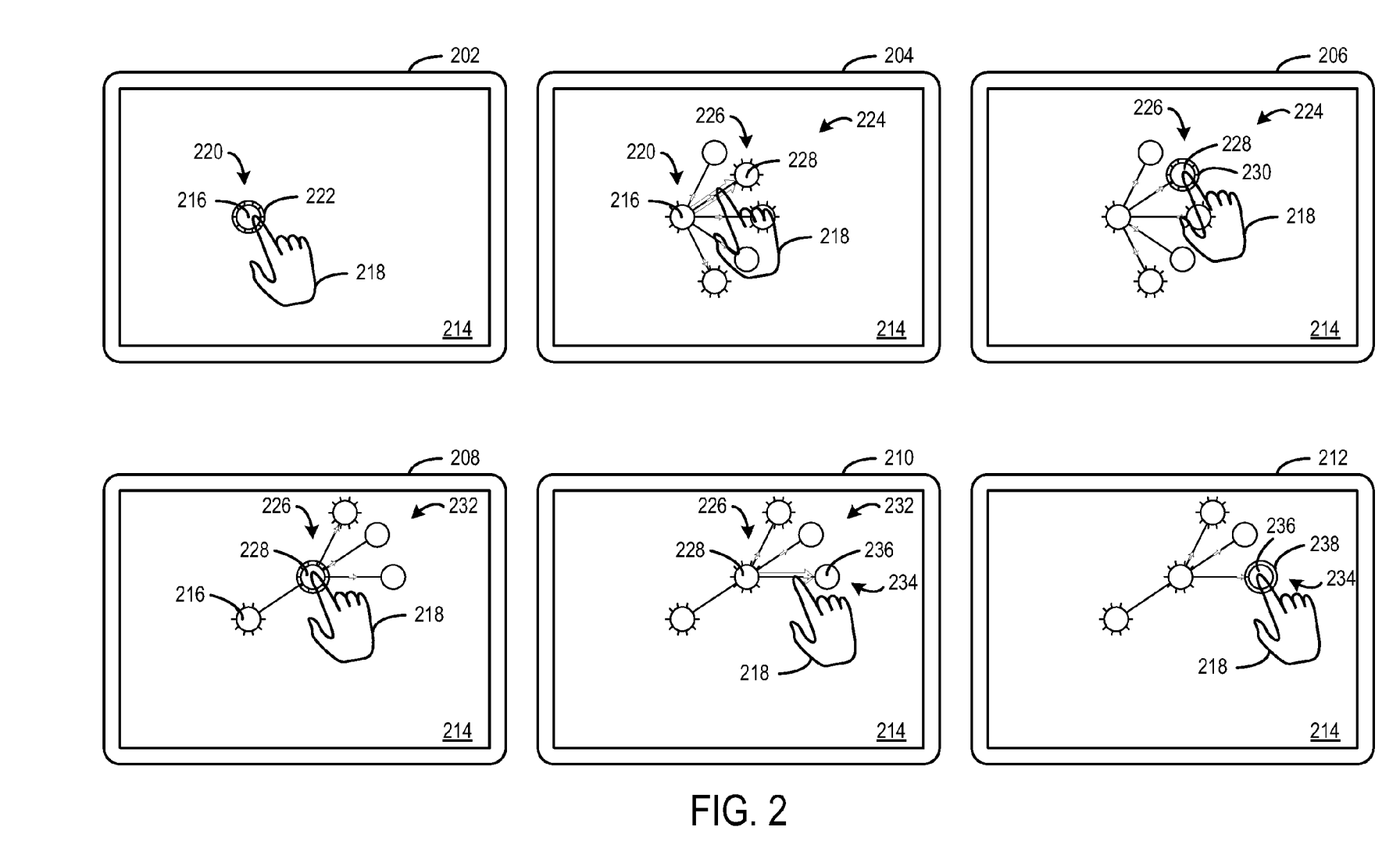
FIG. 2 is a sequence of a one-touch gesture being performed on a touch sensitive display screen of an embodiment of a computing device that causes a graphical user interface (GUI) element function to be performed to transform display of a GUI element on the touch sensitive display screen.

FIG. 2 shows a sequence of a one-touch gesture being performed on a touch sensitive display screen 214 of an embodiment of a computing device that causes a graphical user interface (GUI) element function to be performed to transform display of a GUI element 216 on the touch sensitive display screen. At 202, GUI element 216 may be displayed on touch sensitive display screen 214. A first touch input 218 may be initiated in or may enter a first region 220 of touch sensitive display screen 214 that corresponds to GUI element 216. Upon first touch input 218 being initiated in or entering first region 220, display of GUI element 216 may be transformed to include highlighting 222. The highlighting 222 may indicate selection of GUI element 216.

At 204, in response to first touch input 218 being initiated in or entering first region 220, a first set of GUI sub-elements 224 associated with GUI element 216 may be displayed. The first set of GUI sub-elements 224 may be arranged in a radial pattern around GUI element 216. The GUI element 216 and each of the plurality of GUI sub-elements 224 may be connected via an animated path. In particular, each path may be a static line that includes an animated arrow that repeatedly travels from the GUI element to an associated GUI sub-element. The animated path may act as a visual affordance guiding the user to perform a gestural touch input to select one of the GUI sub-elements.

In the illustrated embodiment, the GUI element may include a menu having a plurality of GUI sub-elements associated with the GUI element that may be organized according to a branching hierarchy. The plurality of GUI sub-elements may include at least one submenu element (indicated by a circle having radial spokes) and/or at least one selectable menu option (indicated by a circle having no radial spokes). Each submenu element may provide another branch in the hierarchy having one or more GUI sub-elements associated with that submenu element. Each selectable menu option may act as an end or leaf of the branching hierarchy.

Continuing with 204, first touch input 218 may slide along a path on touch sensitive display screen 214 from first region 220 that corresponds to GUI element 216 to a second region 226 of touch sensitive display screen 214 that corresponds to a selected GUI sub-element 228 of the plurality of GUI sub-elements 224.

At 206, in response to first touch input 218 entering second region 226 that corresponds to selected GUI sub-element 228 of the first set of GUI sub-elements 224 that is being displayed, display of selected GUI sub-element 228 may be transformed to include highlighting 230. The highlighting 230 may indicate selection of selected GUI sub-element 228 (in this case a submenu).

In some embodiments, sliding the first touch input from the first region to the second region (e.g., creating a line segment having a particular direction/length/position) may be recognized as a one-touch gesture. The one-touch gesture may correspond to a GUI element function that transforms display of the GUI element and/or the GUI sub-elements. For example, transforming may include displaying the GUI sub-elements associated with the GUI element. As another example, transforming may include highlighting a GUI element and/or a selected GUI sub-element. As yet another example, transforming may include concealing non-selected GUI sub-elements.

At 208, in response to first touch input 218 entering second region 226, display of GUI element 216 and/or selected GUI sub-element 228 may be transformed by displaying a second set of GUI sub-elements 232 associated with selected GUI sub-element 228. In this case, since the selected GUI sub-element is a submenu element another branch of the branching hierarchy is displayed. The second set of GUI sub-elements 232 may be arranged in a radial pattern around selected GUI sub-element. Each of the second set of GUI sub-elements may be connected to the selected GUI sub-element via an animated path that acts as a visual affordance guiding the user to perform a gestural input to select that GUI sub-element.

Furthermore, in response to first touch input 218 entering second region 226, display of GUI element 216 and/or selected GUI sub-element 228 may be transformed by concealing all non-selected GUI sub-elements of the first set of GUI sub-elements 224. The non-selected GUI sub-elements may be concealed to simplify display of the GUI element and/or GUI sub-elements so that the user may easily identify a desired GUI sub-element for selection.

Note non-selected GUI sub-elements may be concealed over plural branches of the branching hierarchy. Further, all GUI sub-elements of the GUI element may be concealed in response to the first touch input lifting from the touch sensitive display screen.

At 210, first touch input 218 may slide along a path from second region 226 to a third region 234 of touch sensitive display screen 214 that corresponds to a GUI sub-element 236 of the second set of GUI sub-elements 232 associated with selected GUI sub-element 228.

At 212, in response to first touch input 218 entering third region 234, display of GUI sub-element 236 may be transformed to include highlighting 238. The highlighting 238 may indicate selection of GUI sub-element 236 (in this case a selected menu option). Further, in this case, since GUI sub-element 236 is a selected menu option, display of GUI sub-element 236 may be transformed in response to first touch input 218 lifting from touch sensitive display screen 214 from third region 234. Transforming display of GUI sub-element 236, in this case, may include performing a computing operation of the selected menu option. Examples of computing operations that may be performed may include executing a file, saving a file, opening a window, performing an editing operation, changing display of a GUI element, etc.

In some embodiments, sliding the first touch input from the first region to the second region and from the second region to the third region (i.e., creating a gestural shape including plural line segments having particular directions/lengths/positions) may be recognized as a one-touch gesture. In other words, the one touch gesture may be recognized from a sequence starting with initiation of the first touch input and ending with the first touch input lifting from the touch sensitive display screen.

In the above described sequence, the GUI element includes a menu and the first set of GUI sub-elements and the second set of GUI sub-elements include sub-menus and/or selectable menu options organized according to a branching hierarchy. It will be appreciated that in some embodiments, a GUI element may be representative of an object other than a menu. Further, the GUI sub-elements may be representative of objects other than submenu elements and/or selectable menu options. Further still, the GUI sub-elements may be organized according to an organizational hierarchy other than a branching hierarchy. As such, GUI elements and sets of GUI elements associated with a selected GUI element may not necessarily be GUI sub-elements of the selected GUI element.

Figure 3:
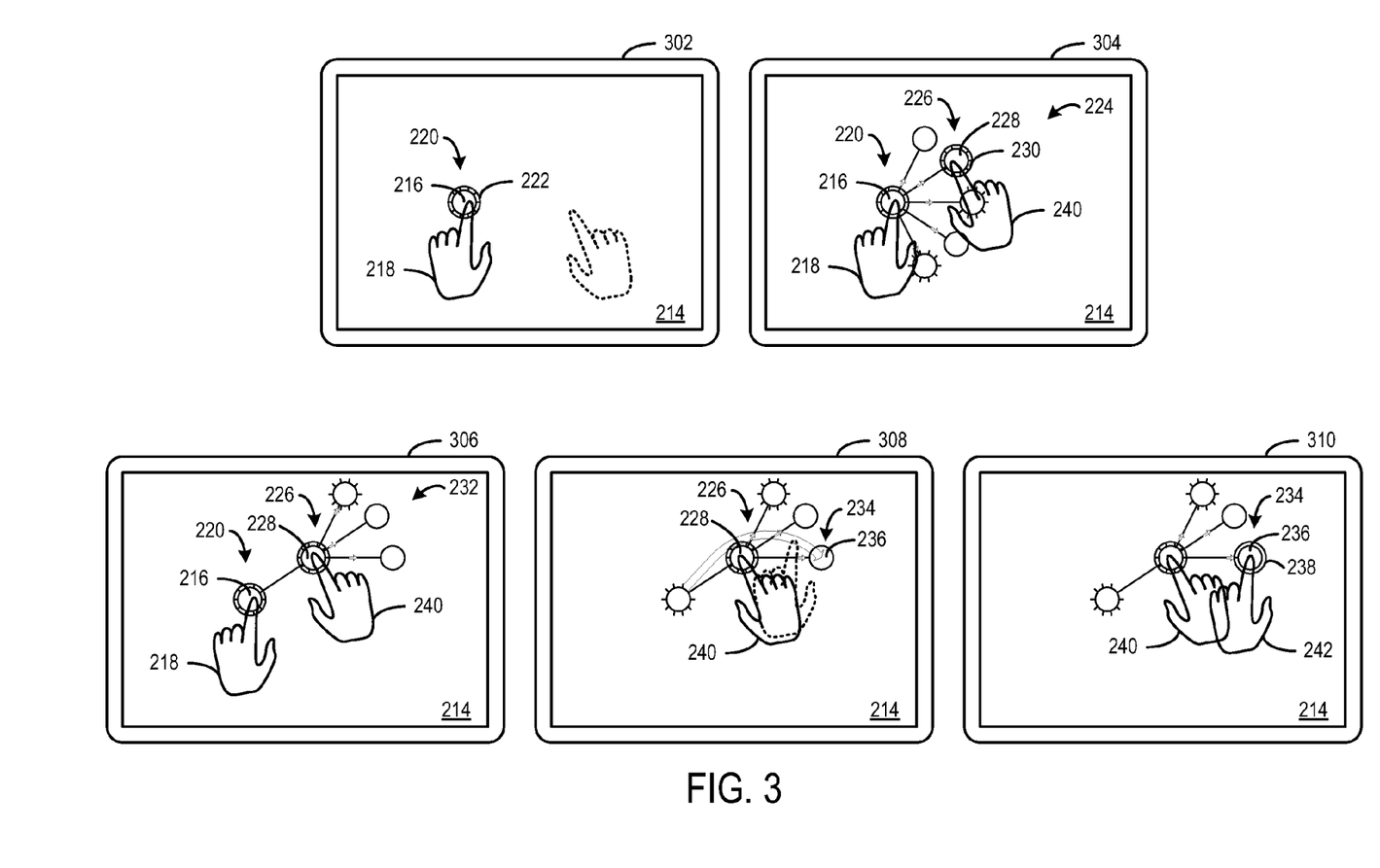
FIG. 3 is a sequence of a multi-touch gesture being performed on a touch sensitive display screen of an embodiment of a computing device that causes a GUI element function to be performed to transform display of a GUI element on the touch sensitive display screen.

FIG. 3 is a sequence of a multi-touch gesture being performed on a touch sensitive display screen 214 of an embodiment of a computing device that causes a GUI element function to be performed to transform display of a GUI element 216 on the touch sensitive display screen. At 302, GUI element 216 may be displayed on touch sensitive display screen 214. A first touch input 218 may be initiated in or may enter a first region 220 of touch sensitive display screen 214 that corresponds to GUI element 216. Upon first touch input 218 being initiated in or entering first region 220, display of GUI element 216 may be transformed to include highlighting 222. The highlighting 222 may indicate selection of GUI element 216.

In the illustrated embodiment, the GUI element may include a menu having a plurality of GUI sub-elements associated with the GUI element that may be organized according to a branching hierarchy. The plurality of GUI sub-elements may include at least one submenu element (indicated by a circle having radial spokes) and/or at least one selectable menu option (indicated by a circle having no radial spokes). Each submenu element may provide another branch in the hierarchy having one or more GUI sub-elements associated with that submenu element. Each selectable menu option may act as an end or leaf of the branching hierarchy.

At 304, in response to first touch input 218 being initiated in or entering first region 220, a first set of GUI sub-elements 224 associated with GUI element 216 may be displayed. The first set of GUI sub-elements 224 may be arranged in a radial pattern around GUI element 216. The GUI element 216 and each of the plurality of GUI sub-elements 224 may be connected via an animated path. In particular, each path may be a static line that includes an animated arrow that repeatedly travels from the GUI element to an associated GUI sub-element. The animated path may act as a visual affordance guiding the user to perform a gestural touch input to select one of the GUI sub-elements.

Furthermore, in response to a second touch input 240 being initiated in or entering a second region 226 of touch sensitive display screen 214 that corresponds to a selected GUI sub-element 228 of the first set of GUI sub-elements 224 while first touch input 218 is in first region 220, display of selected GUI sub-element 228 may be transformed to include highlighting 230. The highlighting 230 may indicate selection of selected GUI sub-element 228.

At 306, in response to second touch input 240 being initiated in or entering second region 226 while first touch input 218 is in first region 220, display of GUI element 216 and/or selected GUI sub-element 228 may be transformed by displaying a second set of GUI sub-elements 232 associated with selected GUI sub-element 228.

Furthermore, in response to second touch input 240 being initiated in or entering second region 226 while first touch input 218 is in first region 220, display of GUI element 216 and/or selected GUI sub-element 228 may be transformed by concealing all non-selected GUI sub-elements of the first set of GUI sub-elements 224. The non-selected GUI sub-elements may be concealed to simplify display of the GUI element and/or GUI sub-elements so that the user may easily identify a desired GUI sub-element for selection.

Note non-selected GUI sub-elements may be concealed over plural branches of the branching hierarchy. Further, all GUI sub-elements of the GUI element may be concealed in response to the first touch input and the second touch input lifting from the touch sensitive display screen.

In some embodiments, placing the second touch input in the second region while the first touch input is in the first region may be recognized as a multi-touch gesture. The multi-touch gesture may correspond to a GUI element function that transforms display of the GUI element and/or the GUI sub-elements. For example, transforming may include displaying the GUI sub-elements associated with the GUI element. As another example, transforming may include highlighting a GUI element and/or a selected GUI sub-element. As yet another example, transforming may include concealing non-selected GUI sub-elements.

At 308, while second touch input 240 is in second region 226, the first touch input may lift from touch sensitive display screen 214 so that a third touch input may be initiated in a third region 234 to select a GUI sub-element 236 associated with selected GUI sub-element 228. In this case, where two hands of a user are performing multi-touch gestures, the user may perform a leap frog type multi-touch gesture where the hand that initiates the first touch input is used to initiate the third touch input. In this case, since the second touch input remains on the touch sensitive display screen, the second set of GUI sub-elements remains displayed.

At 310, in response to third touch input 242 entering third region 234, display of GUI sub-element 236 may be transformed to include highlighting 238. The highlighting 238 may indicate selection of GUI sub-element 236 (in this case a selected menu option). Further, in this case, since GUI sub-element 236 is a selected menu option, display of GUI sub-element 236 may be transformed in response to third touch input 242 lifting from touch sensitive display screen 214 from third region 234 and second touch input 240 lifting from the touch sensitive display screen. Transforming display of GUI sub-element 236, in this case, may include performing a computing operation of the selected menu option.

It will be appreciated that the above described sequences may include actions representative of instructions that may be embodied as a method or as an application executable by a computing system. In the above described sequences, the same functions that transform display of the GUI element and/or GUI sub-elements may be achieved by performing a one-touch gesture or a multi-touch gesture that corresponds to the function. By providing graphical elements that are capable of being manipulated in the same manner using either one-touch gestures or multi-touch gestures, different users who are comfortable with using different user input paradigms (e.g., one-touch input or multi-touch input) each may interact with the GUI element in an effective manner. Moreover, since users may interact with the GUI element using either one or both user input paradigms, a user may be more likely to become comfortable using both user input paradigms, which may enable the user to more effectively interact with various touch sensitive computing systems.

Figure 4:
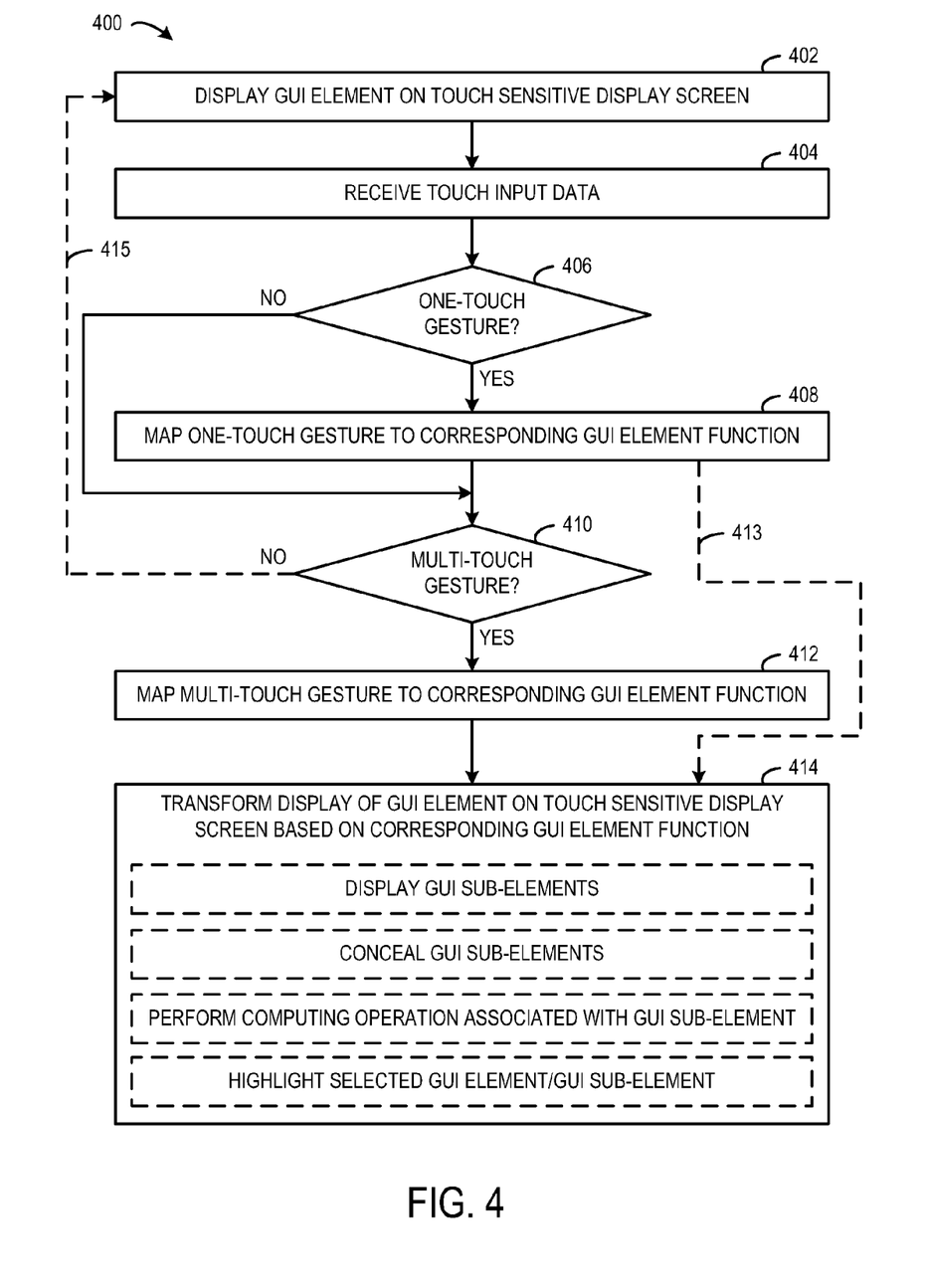
FIG. 4 is a flow diagram of an embodiment of method of operating a touch sensitive display screen of a computing device.

FIG. 4 is a flow diagram of an embodiment of a method 400 of operating a touch sensitive display screen of a computing device according to an embodiment of the present disclosure. The flow diagram of FIG. 4 will be described in the context of the sequences described above and shown in FIG. 2 and FIG. 3.

At 402, the method includes displaying a GUI element on the touch sensitive display screen. For example, GUI program 108 may be configured to generate the GUI element for display on touch sensitive display screen 106 as previously described with reference to FIG. 1. A non-limiting example of the GUI element being display by the touch sensitive display screen is shown at 202 and 302.

At 404, the method includes receiving touch input data. For example, touch input data may be generated by touch sensitive display screen 106 based on touch input to the touch sensitive display screen and gesture recognizer 110 may be configured to receive the touch input data as previously described with reference to FIG. 1.

At 406, the method includes determining if a one-touch gesture is recognized in the touch input data. For example, one-touch module 112 may be configured to determine if the touch input data includes a one-touch gesture as previously described with reference to FIG. 1. If a one-touch gesture is recognized from the touch input data, the method moves to 408. Otherwise, a one-touch gesture is not recognized from the touch input data, and the method moves to 410. A non-limiting example of one-touch gesture(s) being performed is shown in FIG. 2.

At 408, the method includes mapping the one-touch gesture to a corresponding GUI element function in response to receiving touch input data indicative of a one-touch gesture. For example, gesture library 116 may be configured to map a one-touch gesture received from one-touch module 112 to a corresponding GUI element function. Further, gesture library 116 may be configured to provide the corresponding GUI element function to touch sensitive display screen 106 as previously described with reference to FIG. 1.

At 410, the method includes determining if a multi-touch gesture is recognized in the touch input data. For example, multi-touch module 114 may be configured to determine if the touch input data includes a multi-touch gesture as previously described with reference to FIG. 1. If a multi-touch gesture is recognized from the touch input data, the method moves to 412. Otherwise, a multi-touch gesture is not recognized from the touch input data, and the method returns to 402.

At 412, the method includes mapping the multi-touch gesture to the corresponding GUI element function in response to receiving touch input data indicative of a multi-touch gesture. For example, gesture library 116 may be configured to map a multi-touch gesture received from multi-touch module 114 to the corresponding GUI element function. Further, gesture library 116 may be configured to provide the corresponding GUI element function to touch sensitive display screen 106 as previously described with reference to FIG. 1.

At 414, the method includes transforming display of the GUI element on the touch sensitive display screen based on the corresponding GUI element function. For example, the GUI element function may be provided to touch sensitive display screen 106 by gesture library 116 as a result of a corresponding one-touch gesture or a corresponding multi-touch gesture being performed as previously described with reference to FIG. 1. An example of transforming display of the GUI element may include displaying GUI sub-elements associated with the GUI element as shown in 204 of FIG. 2 and 304 in FIG. 3. Another example of transforming display of the GUI element may include concealing GUI sub-elements associated with the GUI element as shown in 208 of FIG. 2 and 306 in FIG. 3. Yet another example of transforming display of the GUI element may include performing a computing operation associated with a GUI sub-element that is associated with the GUI element as shown in 212 of FIG. 2 and 310 in FIG. 3. Yet another example of transforming display of the GUI element may include highlight the GUI element and/or an associated GUI sub-element to indicate selection as shown in 202 and 206 of FIG. 2 and 304 in FIG. 3.

While method 400 includes testing for both a one-touch gesture and a multi-touch gesture, it is within the scope of this disclosure to halt further testing once an appropriate gesture is identified (e.g., as indicated by dashed line 413). Further, if an appropriate gesture is not identified, it is within the scope of this disclosure to continue testing until an appropriate gesture is identified (e.g., as identified by dashed line 415).

The above described method may be performed to allow either one-touch gestures or multi-touch gestures to be used to manipulate a GUI element and/or GUI sub-elements in the same manner. By allowing a user to interact with the GUI element using one-touch gestures or multi-touch gestures, the user choose which type of user input paradigm that they are most comfortable using to interact with the GUI element. Accordingly, the user may be more likely to effectively interact with the GUI element.

Moreover, by implementing one-touch gestures and multi-touch gestures to manipulate the GUI element in the same manner, full functionality may be achieved in computing systems only capable of receiving one-touch input as well as computing systems capable of receiving multi-touch input. Furthermore, in cases where the GUI element is an icon representative of a key, such as in a virtual keyboard, because one-touch gestures and multi-touch gestures may be mapped to the same corresponding function mode or key shift errors may be reduced.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of operating a touch sensitive display screen of a computing device comprising:
    displaying a graphical user interface (GUI) element on the touch sensitive display screen;
    in response to receiving touch input data indicative of a one-touch gesture, the one-touch gesture comprising a sequence starting with initiation of a single touch input at a first endpoint in a first region, sliding along a path from the first endpoint to a second endpoint in a second region, and ending with the single touch input lifting from the touch sensitive display screen at the second region, mapping the one-touch gesture to a corresponding GUI element function;
    in response to receiving touch input data indicative of a multi-touch gesture, the multi-touch gesture comprising multiple concurrent, temporally overlapping touch inputs, the multi-touch gesture including a first touch input being at the first endpoint of the path in the first region while a second touch input is at the second endpoint of the path in the second region, mapping the multi-touch gesture to the corresponding GUI element function, the corresponding GUI element function for the multi-touch gesture being the same as the corresponding GUI element function for the one-touch gesture; and
    transforming display of the GUI element on the touch sensitive display screen based on the corresponding GUI element function, wherein
    the GUI element includes a menu having a plurality of GUI sub-elements associated with the GUI element;
    the plurality of GUI sub-elements are organized according to a branching hierarchy; and
    the plurality of GUI sub-elements include at least one submenu element and/or at least one selectable menu option.

2. The method of claim 1, wherein transforming includes performing a computing operation of a selected menu option of the at least one selectable menu option.

3. The method of claim 1, wherein transforming includes displaying a set of GUI sub-elements associated with a selected submenu element of the at least one submenu element.

4. The method of claim 1, wherein transforming includes highlighting a selected submenu and/or a selected menu option.

5. The method of claim 1, wherein the plurality of GUI sub-elements are arranged in a radial pattern around the GUI element and the GUI element and each of the plurality of GUI sub-elements are connected via an animated path.

6. The method of claim 5, wherein the animated path includes an animated indicator that repeatedly travels from the GUI element to each of the plurality of GUI sub-elements.

7. The method of claim 1, wherein the at least one submenu element and/or at least one selectable menu option is located at the second endpoint and is associated with the corresponding GUI element function.

8. A touch sensitive computing system comprising:
a touch sensitive display screen configured to generate touch input data based on touch input on the touch sensitive display screen; and
a graphical user interface (GUI) program configured to display a GUI element on the touch sensitive display screen that is selectively transformable based on the touch input data, the GUI program comprising:
a gesture recognizer comprising:
a one-touch module configured to receive the touch input data and recognize a one-touch gesture, the one-touch gesture comprising a sequence starting with initiation of a single touch input at a first endpoint in a first region, sliding along a path from the first endpoint to a second endpoint in a second region, and ending with the single touch input lifting from the touch sensitive display screen at the second endpoint;
a multi-touch module configured to receive the touch input data and recognize a multi-touch gesture, the multi-touch gesture comprising multiple concurrent, temporally overlapping touch inputs, wherein the multi-touch gesture includes a first touch input being at the first endpoint of the path in the first region and a second touch input being at the second endpoint of the path in the second region while the first touch input is in the first region; and
a gesture library including a plurality of GUI element functions, at least some of the plurality of GUI element functions each being mapped to a corresponding one-touch gesture as well as to a corresponding multi-touch gesture, the gesture library being configured to provide a selected function of the plurality of GUI element functions to the touch sensitive display screen to transform display of the GUI element in response to receiving a corresponding one-touch gesture from the one-touch module or a corresponding multi-touch gesture from the multi-touch module that is mapped to the selected function, wherein
the GUI element includes a menu having a plurality of GUI sub-elements associated with the GUI element;
the plurality of GUI sub-elements are organized according to a branching hierarchy; and
the plurality of GUI sub-elements include at least one submenu element and/or at least one selectable menu option.

9. The system of claim 8, wherein the selected function includes displaying a set of GUI sub-elements associated with a selected GUI sub-element of the plurality of GUI sub-elements.

10. The system of claim 9, wherein the set of GUI sub-elements are arranged in a radial pattern around the selected GUI sub-element and each GUI sub-element of the set of GUI sub-elements is connected to the selected GUI sub-element via an animated path.

11. The system of claim 10, wherein the at least one submenu element and/or at least one selectable menu option is located at the second endpoint and is associated with the selected function.

12. The system of claim 11, wherein the selected function includes concealing all GUI sub-elements of the plurality of GUI sub-elements that are not selected as the selected GUI sub-element.

13. A method of operating a touch sensitive display screen of a computing device comprising:
displaying a graphical user interface (GUI) element on the touch sensitive display screen;
in response to receiving touch input data indicative of a first touch input being initiated in or entering a first endpoint in a first region of the touch sensitive display screen corresponding to the GUI element, displaying a first set of GUI elements associated with the GUI element;
in response to receiving touch input data indicative of the first touch input sliding along a path to leave the first region and enter a second endpoint in a second region of the touch sensitive display screen corresponding to a selected GUI element of the first set of GUI elements that is being displayed, displaying a second set of GUI elements associated with the selected GUI element; and
in response to receiving touch input data indicative of a second touch input being initiated in or entering the second region at the second endpoint of the path concurrently while the first touch input is at the first endpoint of the path in the first region, displaying the second set of GUI elements associated with the selected GUI element,
wherein the GUI element includes a menu and the first set of GUI elements and the second set of GUI elements, wherein the first set of GUI elements and the second set of GUI elements include sub-menus and/or selectable menu options organized according to a branching hierarchy.

14. The method of claim 13, further comprising:
in response to receiving touch input data indicative of the first touch input and the second touch input lifting from the touch sensitive display screen, concealing the first set of GUI elements and concealing the second set of GUI elements.

15. The method of claim 13, further comprising:
in response to the first touch input entering the second region of the touch sensitive display screen corresponding to the selected GUI element of the first set of GUI elements, concealing all non-selected GUI elements of the first set of GUI elements; and
in response to the second touch input being initiated in or entering the second region while the first touch input is in the first region, concealing all non-selected GUI elements of the first set of GUI elements.

* * * * *